Nov. 28, 1939.   P. C. KEITH, JR., ET AL   2,181,302
CONVERSION OF HYDROCARBONS
Filed April 29, 1937
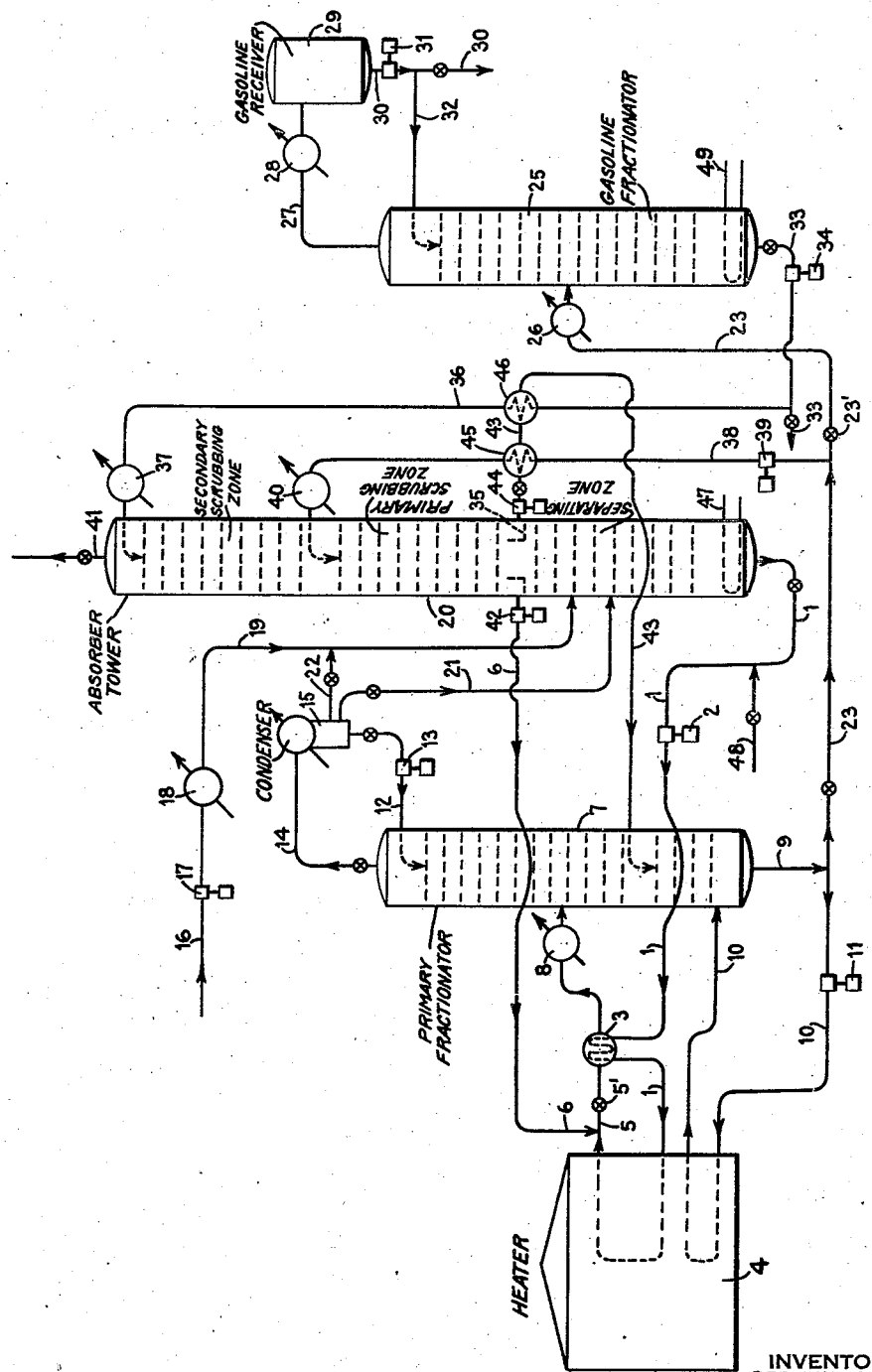
INVENTORS
PERCIVAL C. KEITH Jr.
GEORGE W. ROBINSON
GEORGE ROBERTS Jr.
BY Pike H. Sullivan
ATTORNEY Patented Nov. 28, 1939

2,181,302

UNITED STATES PATENT OFFICE 2,181,302

CONVERSION OF HYDROCARBONS

Percival C. Keith, Jr., Peapack, N. J., George W. Robinson, Houston, Tex., and George Roberts, Jr., Montclair, N. J., assignors to The Polymerization Process Corporation, Jersey City, N. J., a corporation of Delaware Application April 29, 1937, Serial No. 139,704

11 Claims. (Cl. 196—10)

This invention relates to the production of normally liquid hydrocarbons, including gasoline constituents, from normally gaseous hydrocarbons. More particularly, the invention relates to the conversion by polymerization or similar reactions of normally gaseous hydrocarbons such as those comprising natural gas or the gases produced in connection with oil-cracking operations to produce therefrom normally liquid hydrocarbons which include gasoline constituents.

Normally gaseous hydrocarbons, such as natural gas or the gases produced in connection with oil cracking, may be converted preferably after the preliminary removal of hydrogen and methane and excessive quantities of ethane to normally liquid hydrocarbons by subjecting them to temperatures of 750° to 1250° F. at pressures in excess of 400 pounds per square inch, for example, to 3000 pounds per square inch, or at higher temperatures and lower pressures for a relatively longer period or at lower temperature and at lower pressures, if desired, in the presence of catalysts. The products of such a conversion operation include hydrogen, normally gaseous hydrocarbons and normally liquid hydrocarbons.

In operations of this character it is customary to charge a gas fraction directly to a conversion furnace and after completion of the conversion operation to fractionate the products and recycle the intermediate constituents capable of further conversion for admixture with the fresh feed passing to the polymerization or conversion furnace.

This invention contemplates improvements in the preliminary treatment of a stream of normally gaseous hydrocarbons preferably mixed with unconverted gases from the process to produce therefrom a hydrocarbon fraction excellently suited as fresh feed for a conversion operation. It is an object of the present invention to provide a novel cycle of operations whereby the gaseous hydrocarbon stream is efficiently treated to produce therefrom a charging stock of superior quality for the conversion operation and to recover most efficiently substantially all the constituents of the hydrocarbon stream suitable for conversion reactions, and having other novel and advantageous characteristics which will be found to obtain.

According to the present invention a stream of normally gaseous hydrocarbons obtained, for example, from natural gas or from gases produced in connection with oil-cracking operations, such as the overhead from a high-pressure separator or reflux medium from a gasoline stabilizer, is suitably compressed and cooled or refrigerated to condense a substantial fraction thereof which predominates in hydrocarbons most suitable for conversion operations, such as $C_3$ and $C_4$ hydrocarbons. The mixture of liquefied and gaseous constituents of the fresh feed is then passed to a separating zone, preferably conjointly with the normally gaseous hydrocarbons from the conversion reaction products. In the separating zone the liquefied hydrocarbons are separated from the uncondensed gases and are collected for use as charging stock to the conversion reaction.

The uncondensed gases are passed successively through two absorption or scrubbing zones wherein the gases are intimately contacted with suitable absorption media whereby the remaining constituents suitable for conversion are recovered as hydrocarbons dissolved in the absorption media. To effect efficient scrubbing the gases are first scrubbed in the primary scrubbing zone with absorption media, which is preferably a relatively light oil and may suitably consist of a mixture of gasoline, gas oil and a small proportion of heavier oils, which may be obtained, for example, by diverting a portion of the liquids produced in the zone wherein the conversion reaction products are separated into normally gaseous and normally liquid constituents. In the primary scrubbing zone a substantial proportion of the recoverable convertible constituents of the uncondensed gases are recovered.

In the secondary scrubbing zone the absorption media preferably include somewhat heavier oils than the absorption media used in the primary scrubbing zone and may consist suitably of gas oil and a small proportion of heavier oils. Such an oil may be obtained by diverting a portion of the liquids remaining after the gasoline is removed from normally liquid hydrocarbons collected in the zone wherein the conversion products are separated into normally liquid and normally gaseous constituents. In the secondary scrubbing zone a final clean-up of constituents suitable for conversion and recovery of gasoline constituents contained in the gases because of use of absorption media containing gasoline in the primary scrubbing zone is effected. Efficient absorption in the primary scrubbing zone is promoted by the use of absorption media containing gasoline constituents since these are closely related in boiling point to the hydrocarbons desired to be recovered. The use of these materials in the absorption media results in a portion thereof being entrained in the gases being scrubbed. These are recovered in the secondary scrubbing zone, by the use of absorption media relatively free of gasoline constituents, together with additional hydrocarbon gases desired for conversion. The remaining gases stripped of their valuable constituents are discharged from the secondary scrubbing zone, and from the system, and removed for use elsewhere, for example, as fuel. Preferably, the enriched absorption media from the secondary scrubbing zone may be passed to the primary scrubbing zone as part of the absorption media therefor.

The liquefied hydrocarbons collected in the separating zone, which predominate in hydrocarbons most suitable for conversion reaction obtained from the fresh feed and from the normally gaseous hydrocarbons separated in the zone wherein the products of conversion are separated into normally liquid and normally gaseous constituents, are passed to a heater of suitable construction and heated at appropriate pressure conditions to effect conversion to normally liquid hydrocarbons. On emerging from the conversion heater the reaction products are cooled by admixture therewith of liquid absorption media containing normally gaseous hydrocarbons dissolved therein, which may be obtained from the scrubbing zones described above. The mixture of reaction products and absorption media is passed in indirect contact with the incoming fresh feed and is passed to a fractionation zone after being further cooled, if necessary. In the fractionation zone the mixture is separated into normally gaseous and normally liquid hydrocarbons and is contacted, if desirable, by a further quantity of absorption media containing dissolved therein normally gaseous hydrocarbons, which may also be obtained from the scrubbing zones described above.

A portion of the liquids separated in the fractionation zone may be circulated through a separate coil located in the conversion heater in order to maintain the temperature desired in the liquids collected in the zone. A portion of these liquids is withdrawn and passed to a gasoline fractionator wherein gasoline is removed. Another portion may be diverted for use as absorption medium in the primary scrubbing zone. A portion of the liquids remaining after the removal of gasoline in the gasoline fractionator may be used as absorption medium in the secondary scrubbing zone.

The normally gaseous hydrocarbons separated in the zone of fractionation of the conversion reaction products are withdrawn from said zone and after partial condensation the liquefied hydrocarbons and uncondensed gases are passed, in admixture or separately, to the separating zone jointly with the above-described partially condensed fresh feed.

The invention is illustrated in the accompanying drawing wherein the figure is a diagrammatic view in elevation of apparatus suitable for carrying out the present invention. It is to be understood, however, that the drawing is for purposes of illustration only, the invention being capable of other modifications.

In the drawing a stream of hydrocarbons predominating in those most suitable for conversion to normally liquid hydrocarbons, such as C₃ and C₄ hydrocarbons, is passed through line 1 by means of pump 2 through heat exchanger 3 to conversion heater 4 wherein the hydrocarbons are heated under suitable pressure conditions, for example, to a temperature of approximately 1030° F. under a pressure of approximately 1200 pounds per square inch whereby conversion to normally liquid hydrocarbons is effected. The conversion reaction products emerge from the heater 4 through line 5 having a pressure reduction valve 5' therein and are contacted with an absorption medium containing normally gaseous hydrocarbons dissolved therein which are introduced through line 6 which connects with line 5. The mixture of reaction products and absorption medium is then passed to a primary fractionator 7 after being further cooled, if necessary, by passage through cooler 8.

In the fractionator 7 conditions of temperature and pressure are maintained whereby separation of normally liquid and normally gaseous hydrocarbons occurs. For example, the fractionator may be maintained at a pressure of 400 pounds per square inch and with top and bottom temperatures of 150° F. and 525° F., respectively. The normally liquid hydrocarbons collect in the bottom of the fractionator 7 and are withdrawn as desired through line 9. In order to maintain the proper temperature in the liquids collected in the bottom of fractionator 7 a portion of the liquids may be diverted from line 9 for passage through line 10, which includes a coil suitably placed in the heater 4, by means of pump 11, the heater liquids suitably at a temperature of about 700° F. being returned to the bottom of fractionator 7. Vapors and gases in fractionator 7 ascend to the top and encounter increasingly low temperatures whereby normally liquid hydrocarbons are condensed therefrom. Suitable cooling means may be provided for maintaining the proper temperature conditions in the top of the fractionator 7, such as the introduction of reflux through line 12 by means of pump 13.

The uncondensed normally gaseous hydrocarbons are withdrawn from the top of fractionator 7 through line 14 and are passed to a condenser 15 wherein a substantial proportion of the constituents suitable for further conversion treatment, such as C₃ and C₄ hydrocarbons, is condensed therefrom. A portion of the thus produced condensate may be separated and withdrawn from condenser 15 through line 12 for use as reflux in the fractionator 7.

Fresh feed is introduced to the system through line 16 under pressure by means of compressor 17 and passed through cooler 18 wherein a substantial proportion of the constituents thereof suitable for conversion, such as C₃ and C₄ hydrocarbons, is condensed. The mixture of liquefied normally gaseous hydrocarbons and uncondensed gases passes from cooler 18 through line 19 and is introduced to the lower portion of an absorber tower 20, which functions as a separating zone wherein liquefied normally gaseous hydrocarbons and uncondensed gases are separated. To this zone also are introduced the remaining overhead gases from the fractionator 7 which have been partially liquefied in condenser 15. The liquefied and uncondensed gases may be withdrawn from condenser 15 through line 21 in admixture and introduced to the lower portion of absorber tower 20 independently of the fresh feed, or they may be withdrawn from condenser 15 in admixture through line 22 and mixed with the fresh feed in line 19 prior to introduction to the lower portion of absorber tower 20, or a separation of liquids and gases in condenser 15 may be effected with the liquids being withdrawn through line 21 and the gases through line 22.

In the lower portion of absorber tower 20 the separation of liquefied and uncondensed hydrocarbons is effected. The liquefied hydrocarbons collect in the bottom of the absorber tower and are withdrawn therefrom through line 1 as charging stock for the conversion reaction. The uncondensed gases ascend the absorber tower and are scrubbed for the removal of convertible constituents, as further described below. Additional charging stock may be introduced in line 48.

The liquids collected in the bottom of primary fractionator 7 are withdrawn through lines 9 and 22, the latter being provided with a pressure reduction valve 23', and are passed to a gasoline fractionator 25 after being further cooled, if desired, by passage through cooler 26. In the gasoline fractionator 25 conditions of temperature and pressure are maintained whereby gasoline constituents are separated from heavier oils as vapors which ascend the fractionator and are withdrawn from the top thereof through line 27. The gasoline vapors in line 27 are passed through a cooler 28 wherein they are condensed, and the condensed gasoline is collected in gasoline receiver 29. The gasoline thus produced is withdrawn from receiver 29 through line 30 by means of pump 31 and passed for further treatment, if necessary, elsewhere. A portion of the gasoline in line 30 may be diverted through line 32 for return to the gasoline fractionator 25 as reflux to maintain proper temperature conditions in the fractionator to effect efficient separation of gasoline from heavier oils.

The heavier oils are collected in the bottom of gasoline fractionator 25 and are withdrawn therefrom through line 33 by means of pump 34.

The absorber tower 20 conveniently is a unitary structure divided into three zones. The lower portion of the absorber tower 20 constitutes the zone of separation of the partially liquefied streams of normally gaseous hydrocarbons introduced therein, as described above. This zone is separated from the upper portion of the tower by means of trap-out tray 35 which serves to prevent absorption media from descending into said zone of separation. The upper portion of the absorber tower 20 is divided into a primary scrubbing zone located just above the said trap-out tray, and a secondary scrubbing zone, which constitutes the top of said absorber tower 20.

Absorption media are introduced into the absorber tower 20 whereby the gases separated from said streams of partially condensed hydrocarbons introduced into said zone of separation ascend through said primary scrubbing zone in intimate contact with descending absorption media consisting essentially of substantial proportions of gasoline and gas oil together with, if desired, a minor proportion of oils heavier than gas oil. In this primary scrubbing zone a substantial proportion of the convertible constituents remaining in said gases is scrubbed therefrom and recovered by solution in said scrubbing media.

The gases ascending in the absorber tower 20 pass from the primary scrubbing zone into a secondary scrubbing zone wherein they ascend in indirect contact with descending scrubbing media, which consist essentially of gas oil with, if desired, a minor proportion of oils heavier than gas oil. In this secondary scrubbing zone a final clean-up of convertible constituents in the gases is effected whereby substantially all recoverable convertible constituents are scrubbed therefrom and recovered by solution in the absorption media. In this zone also gasoline constituents, entrained in the gases by contact with the gasoline-containing absorption media employed in the primary scrubbing zone, are recovered by absorption in the relatively gasoline-free absorption media employed in the secondary scrubbing zone, as described above. Preferably, the descending absorption media containing normally gaseous hydrocarbons dissolved therein and absorbed gasoline constituents pass directly from the secondary scrubbing zone into the primary scrubbing zone and constitute a portion of the absorption media introduced therein. Additional absorption media are thereupon introduced into said primary scrubbing zone whereby the resulting combined absorption media contain substantial proportions of gasoline as well as gas oil.

To provide suitable absorption media for the secondary scrubbing zone a portion of the bottoms collected in the gasoline fractionator 25 and withdrawn therefrom through line 33 may be diverted through line 36 and introduced into the absorber tower 20 at the top thereof after being cooled by suitable heat exchange and, if necessary, by passage through cooler 37.

Additional scrubbing media for introduction into the primary scrubbing zone in combination with the scrubbing media descending from the secondary scrubbing zone may consist of a portion of the bottoms from primary fractionator 7 passing through line 23 which may be diverted through line 38 by means of pump 39 and introduced into the absorber tower 20, at the intermediate point which separates the said primary and secondary scrubbing zones, after being cooled by suitable heat exchange and, if necessary, by passage through cooler 40.

The absorber tower 20 is maintained under suitable pressure and temperature conditions to effect the operations desired therein. For example, the tower may be maintained under a pressure of approximately 380 pounds per square inch. The liquids collected in the bottom thereof, that is, liquefied normally gaseous hydrocarbons may be maintained at a temperature of approximately 155° F. Inasmuch as the partially liquefied streams of hydrocarbons are introduced through lines 21 and 19 at a temperature of approximately 100° F. this temperature will prevail in the top of said separating zone, that is, just below the trap-out tray 35. The scrubbing media introduced into the upper portion of the absorber tower 20 are suitably cooled to a relatively low temperature to maintain the temperature in the scrubbing zones most suitable for efficient absorption of convertible constituents from the gases passing through. For example, the scrubbing media may be cooled before introduction to a temperature of approximately 95° F. In order to maintain the desired low temperature in the scrubbing zones cooling means (not shown) may be provided for cooling the descending absorption media to counteract the effect of the heat of absorption. The scrubbed gases emerging from the secondary scrubbing zone comprising principally hydrogen and methane are withdrawn from the top of the absorber tower 20 through line 41 and are thereby withdrawn from the system for use elsewhere, for example, as fuel.

It will be understood that the functions of the absorber tower may be performed by a plurality of structures which provide, for example, a separate structure for each of the separating and scrubbing zones. To simplify the illustration of the operations of this part of the process a unitary structure is shown.

The trap-out tray 35 collects the scrubbing media which have passed through the primary and secondary scrubbing zones and contain dissolved therein normally gaseous hydrocarbons recovered from the gases passing through the said scrubbing zone from the separating zone located below the said trap-out tray 35.

At least a portion of the enriched absorption media collected in trap-out tray 35 is withdrawn therefrom through line 6 by means of pump 42 and introduced into admixture with the products of conversion emerging from the heater 4 in line 5. The normally gaseous hydrocarbons dissolved in the absorption media admixed with the conversion products are recovered with the normally gaseous products of conversion in the primary fractionator 7.

An additional portion of the absorption media collected in trap-out tray 35 and preferably a larger portion thereof may be withdrawn therefrom through line 43 by means of pump 44 and introduced into a primary fractionator 7 at an intermediate point to assist in regulating the temperature desired therein and to effect recovery of the normally gaseous hydrocarbons dissolved in the absorption media so introduced, which normally gaseous hydrocarbons are recovered in said primary fractionator 7 with the normally gaseous constituents of the reaction products.

This modification is particularly advantageous when the amount of absorption media used in said scrubbing zones is more, which is usually the case, than the amount desired to be mixed with the conversion products prior to separation of liquids and gases. It may be desirable to pass the absorption media withdrawn through line 43 by indirect heat exchange with the fresh absorption media passing through lines 38 and 36 by means of heat exchangers 45 and 46, respectively, whereby said fresh absorption media are partially cooled.

The absorber tower 20 is provided with suitable bubble caps, plates or other gas and liquid contact means to assist in the intimate contact of the liquids and gases passing therethrough and effect efficient performance of the function of the various portions. Suitable heating means 47 may be provided in the bottom of this tower to maintain the desired temperature therein. This may consist of means for indirect heat exchange with the fresh absorption media passing through line 38.

It is to be understood that the functions of the fractionators 7 and 25 could be performed by a single structure provided with suitable trap-out trays, etc., but in order to simplify presentation of the subject matter of the invention separate structures are illustrated. These fractionators also are provided with suitable bubble caps, plates and other gas and liquid contact means to assist in the intimate contact of liquids and gases therein whereby condensation, evaporation, absorption, stripping and other operations incidental to fractionation are assisted. Heating means 49 is provided in the bottom of the fractionator 25 to maintain the temperature desired therein. These means may consist of means for indirect heat exchange with the bottoms from fractionator 7 passing through line 23.

This invention has been described with reference to specific embodiments illustrated in the accompanying drawing. It is to be understood that the invention is not limited thereby, however, but is capable of other embodiments which may be beyond the physical limitations of the particular apparatus illustrated.

We claim:

1. The method of converting normally gaseous hydrocarbons to normally liquid hydrocarbons which comprises treating a stream of normally gaseous hydrocarbons to liquefy a portion including a substantial proportion of the convertible constituents thereof, separating said liquefied portion from the unliquefied gases of said stream, passing said unliquefied gases through a primary scrubbing zone, introducing into said primary scrubbing zone and into intimate contact with the gases passing therethrough liquid absorbent media comprising a substantial proportion of hydrocarbons in the gasoline boiling range to scrub from said gases a substantial proportion of the convertible constituents remaining therein whereby said convertible constituents are dissolved in said absorbent media, passing said scrubbed gases from said primary scrubbing zone through a secondary scrubbing zone, introducing into said secondary scrubbing zone and into intimate contact with the gases passing therethrough liquid absorbent media consisting essentially of gas oil and at most a minor proportion of heavier oils to scrub from said gases a substantial proportion of the recoverable convertible constituents therein whereby said convertible constituents are dissolved in said last-mentioned absorbent media, heating said liquefied portion of said stream to effect conversion to normally liquid hydrocarbons, contacting the products of conversion with enriched absorbent media from said primary and secondary scrubbing zones, fractionating the resulting mixture to separate normally gaseous constituents including the normally gaseous constituents of said conversion products and the normally gaseous hydrocarbons dissolved in said last-mentioned absorbent media from the normally liquid constituents including normally liquid conversion products and said last-mentioned absorbent media substantially stripped of dissolved normally gaseous hydrocarbons, and incorporating at least a portion of said last-mentioned normally liquid constituents including a substantial proportion of gasoline constituents in the liquid absorbent media introduced into said primary scrubbing zone.

2. The method of converting normally gaseous hydrocarbons to normally liquid hydrocarbons which comprises treating a stream of normally gaseous hydrocarbons to liquefy a portion including a substantial proportion of the convertible constituents thereof, separating said liquefied portion from the unliquefied gases of said stream, passing said unliquefied gases through a primary scrubbing zone, introducing into said primary scrubbing zone and into intimate contact with the gases passing therethrough liquid absorbent media comprising a substantial proportion of hydrocarbons in the gasoline boiling range to scrub from said gases a substantial proportion of the convertible constituents remaining therein whereby said convertible constituents are dissolved in said absorbent media, passing said scrubbed gases from said primary scrubbing zone through a secondary scrubbing zone, introducing into said secondary scrubbing zone and into intimate contact with the gases passing therethrough liquid absorbent media consisting essentially of gas oil and at most a minor proportion of heavier oils to scrub from said gases a substantial proportion of the recoverable convertible constituents therein whereby said convertible constituents are dissolved in said last-mentioned absorbent media, heating said liquefied portion of said stream to effect conversion to normally liquid hydrocarbons, contacting the products of conversion with enriched absorbent media from said primary and secondary scrubbing zones, fractionating the resulting mixture to separate normally gaseous constituents including the normally gaseous constituents of said conversion products and the normally gaseous hydrocarbons dissolved in said last-mentioned absorbent media from the normally liquid constituents including normally liquid conversion products and said last-mentioned absorbent media substantially stripped of dissolved normally gaseous hydrocarbons, fractionating at least a portion of said last-mentioned normally liquid constituents to separate therefrom gasoline constituents, and including at least a portion of the remaining heavier oil impoverished of gasoline constituents in the liquid absorbent media introduced into said secondary scrubbing zone.

3. The method of converting normally gaseous hydrocarbons to normally liquid hydrocarbons which comprises treating a stream of normally gaseous hydrocarbons to liquefy a portion including a substantial proportion of the convertible constituents thereof, separating said liquefied portion from the unliquefied gases of said stream, passing said unliquefied gases through a primary scrubbing zone, introducing into said primary scrubbing zone and into intimate contact with the gases passing therethrough liquid absorbent media comprising a substantial proportion of hydrocarbons in the gasoline boiling range to scrub from said gases a substantial proportion of the convertible constituents remaining therein whereby said convertible constituents are dissolved in said absorbent media, passing said scrubbed gases from said primary scrubbing zone through a secondary scrubbing zone, introducing into said secondary scrubbing zone and into intimate contact with the gases passing therethrough liquid absorbent media consisting essentially of gas oil and at most a minor proportion of heavier oils to scrub from said gases a substantial proportion of the recoverable convertible constituents therein whereby said convertible constituents are dissolved in said last-mentioned absorbent media, introducing at least a portion of the enriched absorbent media from the said secondary scrubbing zone into the primary scrubbing zone as a portion of the liquid absorbent media introduced into said primary scrubbing zone in conjunction with additional absorbent media from another source including a substantial proportion of gasoline constituents, heating said liquefied portion of said stream to effect conversion to normally liquid hydrocarbons, contacting the products of conversion with enriched absorbent media from said primary scrubbing zone, and fractionating the resulting mixture to separate normally gaseous constituents including the normally gaseous constituents of said conversion products and the normally gaseous hydrocarbons dissolved in said last-mentioned absorbent media from the normally liquid constituents including normally liquid conversion products and said last-mentioned absorbent media substantially stripped of dissolved normally gaseous hydrocarbons.

4. The method of converting normally gaseous hydrocarbons to normally liquid hydrocarbons which comprises treating a stream of normally gaseous hydrocarbons to liquefy a portion including a substantial proportion of the convertible constituents thereof, separating said liquefied portion from the unliquefied gases of said stream, passing said unliquefied gases through a primary scrubbing zone, introducing into said primary scrubbing zone and into intimate contact with the gases passing therethrough liquid absorbent media comprising a substantial proportion of hydrocarbons in the gasoline boiling range and a substantial proportion of hydrocarbons in the gas oil boiling range to scrub from said gases a substantial proportion of the convertible constituents remaining therein whereby said convertible constituents are dissolved in said absorbent media, passing said scrubbed gases from said primary scrubbing zone through a secondary scrubbing zone, introducing into said secondary scrubbing zone and into intimate contact with the gases passing therethrough liquid absorbent media consisting essentially of gas oil and at most a minor proportion of heavier oils to scrub from said gases a substantial proportion of the recoverable convertible constituents therein whereby said convertible constituents are dissolved in said last mentioned absorbent media, heating said liquefied portion of said stream to effect conversion to normally liquid hydrocarbons, contacting the products of conversion with enriched absorbent media from said primary and secondary scrubbing zone, and fractionating the resulting mixture to separate normally gaseous constituents including the normally gaseous constituents of said conversion products and the normally gaseous hydrocarbons dissolved in said last-mentioned absorbent media from the normally liquid constituents including normally liquid conversion products and said last-mentioned absorbent media substantially stripped of dissolved normally gaseous hydrocarbons.

5. The method of converting normally gaseous hydrocarbons to normally liquid hydrocarbons which comprises treating a stream of normally gaseous hydrocarbons to liquefy a portion including a substantial proportion of the convertible constituents thereof, separating said liquefied portion from the unliquefied gases of said stream, passing said unliquefied gases through a primary scrubbing zone, introducing into said primary scrubbing zone and into intimate contact with the gases passing therethrough liquid absorbent media comprising hydrocarbons in the gasoline boiling range including a substantial proportion of low boiling constituents of gasoline to scrub from said gases a substantial proportion of the convertible constituents remaining therein whereby said convertible constituents are dissolved in said absorbent media, passing said scrubbed gases from said primary scrubbing zone through a secondary scrubbing zone, introducing into said secondary scrubbing zone and into intimate contact with the gases passing therethrough liquid absorbent media consisting essentially of gas oil and at most a minor proportion of heavier oils to scrub from said gases a substantial proportion of the recoverable convertible constituents therein whereby said convertible constituents are dissolved in said last-mentioned absorbent media, heating said liquefied portion of said stream to effect conversion to normally liquid hydrocarbons, contacting products of conversion with enriched absorbent media from said primary and secondary scrubbing zones, and fractionating the resulting mixture to separate normally gaseous constituents including the normally gaseous constituents of said conversion products and the normally gaseous hydrocarbons dissolved in said last-mentioned absorbent media from the normally liquid constituents including normally liquid conversion products and last-mentioned absorbent media substantially stripped of dissolved normally gaseous hydrocarbons.

6. A process in accordance with claim 5 wherein products of conversion are contacted with the enriched absorption media during the separation thereof into normally liquid and normally gaseous hydrocarbons.

7. A process in accordance with claim 5 wherein products of conversion are contacted with the enriched absorption media prior to and during the separation thereof.

8. A process in accordance with claim 5 wherein the normally gaseous hydrocarbons separated from the mixture including the products of conversion are cooled to liquefy a portion thereof including a substantial proportion of the convertible constituents thereof and combined with the first-mentioned stream of normally gaseous hydrocarbons for treatment therewith.

9. The method of converting normally gaseous hydrocarbons to normally liquid hydrocarbons which comprises heating convertible normally gaseous hydrocarbons to effect conversion thereof to normally liquid hydrocarbons, contacting the products of conversion with a cooling medium consisting of liquid hydrocarbons containing dissolved therein normally gaseous hydrocarbons, fractionating the resulting mixture to separate normally gaseous constituents including the normally gaseous constituents of said conversion products and normally gaseous hydrocarbons dissolved in said cooling medium from the normally liquid constituents including normally liquid conversion products and the said cooling medium substantially stripped of dissolved normally gaseous hydrocarbons, passing normally gaseous constituents thus obtained through a primary scrubbing zone, introducing into said primary scrubbing zone and into intimate contact with the gases passing therethrough a portion of said normally liquid constituents including a substantial proportion of hydrocarbons in the gasoline boiling range as liquid absorbent media to scrub from said gases a substantial proportion of convertible constituents remaining therein whereby said convertible constituents are dissolved in said absorbent media, passing said scrubbed gases from said primary scrubbing zone into a secondary scrubbing zone, introducing into said secondary scrubbing zone and into intimate contact with the gases passing therethrough liquid absorbent media consisting essentially of gas oil and at most a minor proportion of heavier oils to scrub from said gases a substantial proportion of the recoverable convertible constituents therein whereby said convertible constituents are dissolved in said last-mentioned absorbent media, and contacting the products of conversion as described with a cooling medium comprising enriched absorbent media from said primary and secondary scrubbing zones.

10. The method of converting normally gaseous hydrocarbons to normally liquid hydrocarbons which comprises heating convertible normally gaseous hydrocarbons to effect conversion thereof to normally liquid hydrocarbons, contacting the products of conversion with a cooling medium consisting of liquid hydrocarbons containing dissolved therein normally gaseous hydrocarbons, fractionating the resulting mixture to separate normally gaseous constituents including the normally gaseous constituents of said conversion products and the normally gaseous hydrocarbons dissolved in said cooling medium from the normally liquid constituents including normally liquid conversion products and the said cooling medium substantially stripped of dissolved normally gaseous hydrocarbons, passing normally gaseous constituents thus obtained through a primary scrubbing zone, fractionating at least a portion of said normally liquid constituents into a gasoline fraction and a heavier oil fraction impoverished of gasoline constituents, introducing into said primary scrubbing zone and into contact with the gases passing therethrough liquid absorbent media comprising a substantial proportion of hydrocarbons in the gasoline boiling range to scrub from said gases a substantial proportion of the convertible constituents remaining therein whereby said convertible constituents are dissolved in said absorbent media, passing said scrubbed gases from said primary scrubbing zone through a secondary scrubbing zone, introducing into said secondary scrubbing zone and into intimate contact with the gases passing therethrough at least a portion of the said heavier oil fraction impoverished of gasoline constituents as liquid absorbent media to scrub from said gases a substantial proportion of the recoverable convertible constituents therein whereby said convertible constituents are dissolved in said last-mentioned absorbent media, and contacting the products of conversion as described with a cooling medium comprising enriched absorbent media from said primary and secondary scrubbing zones.

11. The method of converting normally gaseous hydrocarbons to normally liquid hydrocarbons which comprises heating convertible normally gaseous hydrocarbons to effect conversion thereof to normally liquid hydrocarbons, contacting the products of conversion with a cooling medium consisting of liquid hydrocarbons containing dissolved therein normally gaseous hydrocarbons, fractionating the resulting mixture to separate normally gaseous constituents including the normally gaseous constituents of said conversion products and the normally gaseous hydrocarbons dissolved in said cooling medium from the normally liquid constituents including normally liquid conversion products and cooling medium substantially stripped of dissolved normally gaseous hydrocarbons, passing normally gaseous constituents thus obtained through a primary scrubbing zone, fractionating a portion of the said normally liquid constituents into a gasoline fraction and a heavier oil fraction impoverished of gasoline constituents, introducing another portion of the normally liquid hydrocarbons obtained by the first-mentioned fractionation into the said primary scrubbing zone and into intimate contact with the gases passing therethrough as liquid absorbent media to scrub from said gases a substantial proportion of the convertible constituents remaining therein whereby said convertible constituents are dissolved in said absorbent media, passing said scrubbed gases from said primary scrubbing zone through a secondary scrubbing zone, introducing at least a portion of said heavier oil fraction into said secondary scrubbing zone and into intimate contact with the gases passing therethrough as liquid absorbent media to scrub from said gases a substantial proportion of the recoverable convertible constituents therein whereby said convertible constituents are dissolved in said absorbent media, and contacting the products of conversion as described with a cooling medium comprising enriched absorbent media from said primary and secondary scrubbing zones.

PERCIVAL C. KEITH, Jr.
GEORGE W. ROBINSON.
GEORGE ROBERTS, Jr.